United States Patent

[11] 3,622,848

| [72] | Inventors | William Robert Hendrix<br>Newark;<br>Stanley Tocker, Wilmington, both of Del. |
|---|---|---|
| [21] | Appl. No. | 21,191 |
| [22] | Filed | Mar. 19, 1970 |
| [45] | Patented | Nov. 23, 1971 |
| [73] | Assignee | E. I. du Pont de Nemours and Company<br>Wilmington, Del. |

[54] CAPACITOR WITH PHOTOCROSSLINKED DIELECTRIC
6 Claims, No Drawings

[52] U.S. Cl. .................................................. 317/258, 204/157.1, 264/22
[51] Int. Cl. .................................................. H01g 3/00
[50] Field of Search .................................................. 204/155, 157.1, 159.17, 162; 264/22, 23; 260/329.2, 878; 317/258, 259, 260

[56] References Cited
UNITED STATES PATENTS

| 2,793,970 | 5/1957 | Jeppson | 264/22 X |
| 3,219,566 | 11/1965 | Potts et al. | 204/162 |
| 3,430,116 | 2/1969 | Johnstone | 317/258 |

FOREIGN PATENTS

| 1,099,853 | 1/1968 | Great Britain | 260/878 |

Primary Examiner—Lewis H. Myers
Assistant Examiner—A. T. Grimley
Attorney—Francis A. Paintin

ABSTRACT: Films of photocrosslinked blends of linear polypropylene with 0.02 to 2 weight percent of a photo-sensitizing agent are used as dielectric spacers for capacitors. The sensitizing agent can be polymeric, e.g., a copolymer of ethylene and acryloxy benzophenone, or nonpolymeric, e.g., 2-methyl-anthraquinone. The films are advantageously oriented after extrusion and before cross-linking.

CAPACITOR WITH PHOTOCROSSLINKED DIELECTRIC

BACKGROUND OF THE INVENTION

Capacitors using polypropylene as a dielectric material are known in the art. Such capacitors are described in Cox, U.S. Pat. No. 3,363,156, and British Pat. No. 863,414. The polypropylene material used according to those references is variously defined as isotactic, crystalline or partially amorphous; however, it is clear that a thermoplastic, rather than a thermoset or cross-linked, polypropylene is employed. While the use of such materials afforded many improvements over earlier structures, there are certain applications, e.g., lamp ballast capacitors, where higher temperature characteristics are desirable.

SUMMARY OF THE INVENTION

In a capacitor comprising at least a pair of electrodes separated with a dielectric spacer, the improvement wherein said dielectric is a photocrosslinked blend of linear polypropylene with from 0.02 to 2 weight percent of a photosensitizing agent.

DETAILED DESCRIPTION OF THE INVENTION

The term "crosslinked" as used herein means that the resulting material has a gel content greater than 12 weight percent when measured after extraction with refluxing xylene for 16 hours. The term "photocrosslinking" as used herein means achieving such increase in the gel content by subjecting the material to radiation, for example, as described in Tocker, U.S. Pat. No. 3,214,492. The term "photosensitizing agent" includes both polymeric and nonpolymeric agents. Suitable nonpolymeric agents can be defined as substituted diaromatic ketones free of hydroxyl groups in the 2,2' and 6,6' positions. Representative of such agents are 2-methylanthraquinone, which is preferred, and p-acryloxybenzophenone.

Suitable polymeric photosensitizing agents include interpolymers of an α-olefin, such as ethylene, with a phenone containing monomer, i.e., an unsaturated compound containing the benzoyl radical, free of hydroxyl groups on carbon atoms adjacent to the carbonyl group and compatible with the blend of polymers. Representative of such polymers are copolymers of ethylene with acrylic esters of benzophenone or acetophenone, the terpolymer of ethylene/methacryloxy benzophenone/methyl methacrylate, ethylene/4-methacryloxy anthraquinone, as well as copolymers with acryloxyalkoxy and methacryloxyalkoxy- substituted phenones of acrylamidophenones, and vinyl phenones. It is preferred that such polymers contain about 75 to 95 weight percent ethylene units. The polymeric photosensitizing agent can be prepared as set forth in Tocker, U.S. Pat. No. 3,214,492, by direct polymerization of ethylene with the phenone containing monomer, or in accordance with Blatz et al., U.S. Pat. No. 3,441,545, by producing first an ethylene-carboxylic acid halide copolymer with subsequent modification by introducing phenone containing moieties onto the polymeric background at the acyl chloride groups. The teachings of both these patents are incorporated herein by reference.

In preparing the blends, it is optional to have up to about 20 percent of a third component, i.e., a poly-α-olefin other than polypropylene. The preferred polymer is polyethylene or an ethylene copolymer, preferably in amounts less than 10 percent. While large amounts of such a polymer might adversely affect the high temperature operation performance, small amounts may be beneficial in increasing the efficiency of photocross-linking.

The films of this invention may contain minor amounts of additives as long as the dielectric and thermal properties are not harmed. Thermal stabilizers may be present to reduce the thermal degradation during extrusion. Nucleating agents or web handling prompting agents (slip, antiblock, low-friction) either organic or inorganic may be present in concentrations less than 1 percent. Antistatic agents are also included. Since high transparency is sometimes objectionable because it is difficult to see the film, minor amounts of matting agents, opacifying agents, or dyes may also be incorporated. In most instances, it is desirable to incorporate the agents before extrusion, but some may be supplied as an after size.

The combination of photosensitizing agent with the polypropylene is best carried out in a high-shear mixer, which may be an extruder or blender, prior to the final film formation. The higher the crystallinity the more the care which must to taken to insure good blending. The photosensitizing agent, whether monomeric or polymeric, does not enter the crystalline regions, but may be present in the amorphous regions. The polymeric agents discussed above are preferred because they are better retained by film.

It is further advantageous to orient the film after extrusion. This results in the gel content of the film being increased after cross-linking. It is not fully understood why this improvement does occur, but it may be associated in some way in increasing the contact between the crystalline areas and the photosensitizer. The orientation should be carried out at temperatures below the polymer melt temperature. For a substantially linear polypropylene, this is 169° C. The orientation temperature should be at least 10° C. less than the polymer melt temperature. Films with small amounts of stretch are hard to distinguish from the unoriented film. If the area is increased by a factor of at least 4, an improvement is obtained. The stretching can be carried out in one or more directions. The film may be oriented by stretching, blowing or rolling. It is preferred to blow orient the film and to do so effectively biaxially.

The ultraviolet radiation may be carried out with any artificial light source having a substantial portion of the radiation between a wavelength of 2,000 Angstroms to 3,000 Angstroms. Typical sources include carbon arc lamps and low-pressure mercury vapor lamps. An ultraviolet lamp such as the Hanovia medium pressure SS-78A (Englehard Hanovia Inc., Newark, N.J.) is a suitable source of radiation. The length of exposure can vary from less than 1 second to 30 seconds or more depending upon the amount of photosensitizing agent, the radiation source, the film thickness, and the extent of orientation.

Gel measurements are made by placing weighed amounts of film in 300-mesh stainless steel baskets. The films are extracted for 16 hours in p-xylene which is maintained at the reflux. The baskets are removed and dried in a vacuum oven with a nitrogen bleed at 60° C. overnight. The gel contents are determined from the initial and final weights.

The invention will now be described in connection with specific examples thereof wherein parts and percentages are by weight unless otherwise specified.

EXAMPLE 1

A copolymer of ethylene with acryloxy benzophenone is prepared by the high-pressure synthesis of example 1 of Tocker, U.S. Pat. No. 3,214,492. The copolymer contains about 90 percent ethylene units. The copolymer is blended in a twin screw mixer with linear polypropylene having a melt index of 3 at 230° C. in the ratio of 10 to 90 parts respectively. The mixture is extruded and tubularly oriented in accordance with example 1 of Goldman et al., U.S. Pat. No. 3,141,912. The film is about 0.5 mil thick. The film is cross-linked by exposure on a drum to a Hanovia ultraviolet source placed 4 inches from the film. The exposure time is about 13 seconds. The photocrosslinked film has a gel content of about 40 percent, whereas an uncrosslinked control film has a gel content of about 3 percent.

The loss factor is measured as a function of temperature. A liquid immersion container with a test cell (Balsbaugh Laboratories Type 100) is used for single sheet measurement. The impregnating liquid was trichlorobiphenyl ("Arochlor 1242"). The cross-linked polymer maintains a desirably low loss factor and is still intact above 140° C. The loss factor for the control rises rapidly above 100° C. and the film fails by dissolution at 130° C. The behavior of the control and the film of this invention are essentially identical below 100° C.

Film made in accordance herewith can be vacuum metallized and made into a capacitor as shown in FIG. 1 of Baldwin, U.S. Pat. No. 3,271,642.

EXAMPLE 2

Capacitors are prepared (0.5 microfarad) by winding two dielectric spacer films prepared in example 1 with two 0.25 mil aluminum foils to form a structure such as in FIG. 2 of U.S. Pat. No. 3,363,156. The film is 2 inches wide and the foil is 1.5 inches wide. Approximately 250 turns are made. The capacitors tested at room temperature typically withstand about 2,000 volts DC.

EXAMPLE 3

A capacitor of example 2 is placed in glass container and vacuum dried at 85° C. and 0.02 torr. for 2 hours. The container is filled with "Arochlor 1242," and allowed to impregnate as described in U.S. Pat. No. 3,363,156 in the oven for 20 hours. The capacitor is sealed, removed from the oven and cooled.

A control capacitor with uncross-linked dielectric and a cross-linked capacitor are given a thermal test. The capacitors are placed in an oven at 50° C. and heated at the rate of 1° C. per minute. The following typical data are obtained by AC testing at 75 volts and 100 hertz:

DISSIPATION FACTOR

| Sample | 100° C. | 125° C. | 130° C. |
|---|---|---|---|
| Control | 0.0040 | 0.00067 | Shorted |
| Cross-linked | 0.0043 | 0.00058 | 0.00092 |

The capacitor of this invention is typically maintained for 1 hour at 130° C. without failure, whereas a control capacitor typically fails at 130° C. by shorting of the electrodes because of the softened film.

EXAMPLE 4

A capacitor is prepared as in example 3 except that capacitor paper is interweaved between the foil and the cross-linked dielectric. The capacitor is impregnated with "Arochlor 1242" and sealed. The corona starting voltage is typically in excess of 600 volts AC.

EXAMPLE 5

An ethylene/methacrylic acid copolymer containing about 85 percent ethylene units is reacted with thionyl chloride to produce acid chloride groups followed by addition of 2-hydroxy benzophenone in perchloroethylene solution generally in accordance with Blatz et al., U.S. Pat. No. 3,441,545. About two-thirds of the acid groups are reacted. The residual acid groups are esterified with methanol. The final product is a copolymer of ethylene/methacryloxybenzophenone/methyl methacrylate in weight ratios of 85/10/5. The copolymer (10 parts) is blended with linear polypropylene, of melt index 3 (90 parts), in a CV type Atlantic Mixer (Atlantic Research Corp., Alexandria, Va.) at 220° C. The film is extruded through a 6-inch flat die at a temperature of 225° C. The film is about 1 mil thick.

The polymer blend is extruded about 13 mils thick. Samples are cut 4 inch by 4 inch square and oriented biaxially in a laboratory stretcher at 155° C. four times its initial dimensions. The samples are air quenched to 50° C. or below and removed from the stretcher. The film is 0.8 mil thick and the gel content about 30 percent. The electrical properties are similar to the cross-linked sample of example 1. If, however, a 1-mil film is extruded and exposed to the ultraviolet lamp described in example 1 for about 13 seconds on each side by passing the film through twice but with alternate sides up, the gel content is only about 11 percent. The single sheet measurements are essentially the same as the control in example 1, thus showing that gel contents of below about 12 percent behave like uncrosslinked controls.

EXAMPLE 6

A copolymer of ethylene with methacryloxy methyl anthraquinone is prepared in accordance with the procedure of example 5 using hydroxy methyl anthraquinone. The composition is about 90/10. The copolymer (10 parts) is blended with polypropylene, melt index of 6 (90 parts). The film is extruded and cross-linked and tested in accordance with example 1. The control film degrades at about 100° C., whereas cross-linked film maintains a dissipation factor of about 0.003±0.0005 for 1,000 hours at 150° C.

EXAMPLE 7

A 1-mil film made from the polypropylene of example 1 is soaked in a solution of 2-methyl anthraquinone. The film is oven dried at 80° C. for 1 hour. The pickup of sensitizer as measured by infrared is about 0.48 percent equivalent weight. The film is exposed to a General Electric UA-3 mercury vapor lamp for 120 seconds. This film shows tensile failure at about 10 pounds per square inch load at 221° C. in contrast to 175° C. for the control and 240° C. for the film of example 1. The cross-linked film can be used as a dielectric spacer for a capacitor in accordance with the teachings hereof.

The dielectric spacer of this invention can be employed in the usual manner in many known capacitor structures. For example, it can be used as the polymeric dielectric spacer in the capacitor structures shown in FIG. 2 of Baldwin, U.S. Pat. No. 3,271,642, and FIGS. 2 and 4 of Rayburn, U.S. Pat. No. 3,267,343, in the manner described in those patents. The halogenated impregnant as defined in U.S. Pat. No. 3,363,156 may be used in the manner described therein.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

We claim:

1. In a capacitor comprising at least a pair of electrodes separated with a dielectric spacer, the improvement wherein said dielectric is a photocrosslinked blend of linear polypropylene with from 0.02 to 2 weight percent of a photosensitizing agent consisting of a copolymer of ethylene and a phenone containing monomer containing 75 to 95 weight percent ethylene units.

2. Capacitor of claim 1 wherein said blend contains up to about 20 percent of poly-α-olefin other than polypropylene.

3. Capacitor of claim 2 wherein said blend contains less than 10 percent poly-α-olefin and less than 1 percent photosensitizing agent.

4. Capacitor of claim 1 wherein said monomer is acryloxybenzophenone.

5. Capacitor of claim 1 wherein said monomer is methacryloxybenzophenone.

6. In a capacitor comprising at least a pair of electrodes separated with a dielectric spacer, the improvement wherein said dielectric is a photocrosslinked blend of linear polypropylene with from 0.02 to 2 weight percent of 2-methyl anthraquinone.

* * * * *

PO-1050
(5/69)

UNITED STATES PATENT OFFICE
CERTIFICATE OF CORRECTION

Patent No. 3,622,848  Dated November 23, 1971

Inventor(s) William Robert Hendrix and Stanley Tocker

It is certified that error appears in the above-identified patent and that said Letters Patent are hereby corrected as shown below:

Column 2, line 9, "to taken" should read -- be taken --.

Column 4, line 20, "150°C." should read -- 105°C. --.

Signed and sealed this 19th day of September 1972.

(SEAL)
Attest:

EDWARD M. FLETCHER, JR.
Attesting Officer

ROBERT GOTTSCHALK
Commissioner of Patents